United States Patent
You et al.

(10) Patent No.: US 9,491,741 B2
(45) Date of Patent: Nov. 8, 2016

(54) METHOD FOR TRANSMITTING CONTROL INFORMATION ON LOW-COST MACHINE-TYPE COMMUNICATION, AND APPARATUS FOR SUPPORTING SAME

(71) Applicant: LG ELECTRONICS INC., Seoul (KR)

(72) Inventors: Hyangsun You, Anyang-si (KR); Joonkui Ahn, Anyang-si (KR); Yunjung Yi, Anyang-si (KR); Suckchel Yang, Anyang-si (KR); Bonghoe Kim, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 14/396,579

(22) PCT Filed: May 2, 2013

(86) PCT No.: PCT/KR2013/003797
§ 371 (c)(1),
(2) Date: Oct. 23, 2014

(87) PCT Pub. No.: WO2013/165183
PCT Pub. Date: Nov. 7, 2013

(65) Prior Publication Data
US 2015/0092694 A1 Apr. 2, 2015

Related U.S. Application Data

(60) Provisional application No. 61/641,844, filed on May 2, 2012.

(51) Int. Cl.
| | |
|---|---|
| H04W 4/00 | (2009.01) |
| H04W 72/04 | (2009.01) |
| H04L 5/00 | (2006.01) |
| H04W 72/12 | (2009.01) |

(52) U.S. Cl.
CPC ........ *H04W 72/0406* (2013.01); *H04L 5/0053* (2013.01); *H04W 4/005* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2011/0170515 A1* | 7/2011 | Kim .................... | H04W 72/042 370/330 |
| 2013/0070710 A1* | 3/2013 | Guo ..................... | H04W 4/005 370/329 |
| 2013/0077594 A1 | 3/2013 | Park et al. | |

(Continued)

FOREIGN PATENT DOCUMENTS

| | | |
|---|---|---|
| KR | 10-2011-0072478 A | 6/2011 |
| KR | 10-2011-0083487 A | 7/2011 |

(Continued)

OTHER PUBLICATIONS

IPWireless Inc., "Backwards compatible support for reduced bandwidth LTE UEs", 3GPP TSG RAN WG1 Meeting #68, R1-120799, Feb. 6-10, 2012, 6 pgs.

(Continued)

*Primary Examiner* — Chi H Pham
*Assistant Examiner* — Soon-Dong D Hyun
(74) *Attorney, Agent, or Firm* — Birch, Stewart, Kolasch & Birch, LLP

(57) ABSTRACT

The present invention relates to a method for transmitting and receiving an uplink signal for low-cost machine-type communication (MTC) used in a wireless communication system, and the apparatuses for supporting same. The base station of the present invention sets a maximum number of RBs capable of being allocated to the MTC device to be smaller than the total number of RBs in a system band supported by the base station. The MTC device of the present invention transmits an uplink signal through a physical uplink shared channel (PUSCH) on the basis of the maximum number of RBs capable of being allocated to the MTC device.

10 Claims, 9 Drawing Sheets

(a)

(b)

(56) References Cited

U.S. PATENT DOCUMENTS

| | | | |
|---|---|---|---|
| 2013/0083753 A1* | 4/2013 | Lee | H04W 72/0453 370/329 |
| 2013/0114570 A1 | 5/2013 | Park et al. | |
| 2013/0176995 A1 | 7/2013 | Park et al. | |
| 2014/0314175 A1* | 10/2014 | Nilsson | H04B 1/0475 375/295 |
| 2015/0011233 A1* | 1/2015 | Kazmi | H04W 16/14 455/454 |
| 2015/0131749 A1* | 5/2015 | Slomina | H04J 11/005 375/260 |
| 2015/0365935 A1* | 12/2015 | Wang | H04W 72/0413 370/329 |

FOREIGN PATENT DOCUMENTS

| | | |
|---|---|---|
| WO | WO 2011/755778 A2 | 12/2011 |
| WO | WO 2012/005494 A2 | 1/2012 |
| WO | WO 2012/023819 A2 | 2/2012 |

OTHER PUBLICATIONS

NEC Group, "Maximum bandwidth reduction for low-cost MTC UE based on LTE", 3GPP TSG RAN WG1 Meeting #68, R1-120259, Feb. 6-10, 2012, 6 pgs.

* cited by examiner

FIG. 5
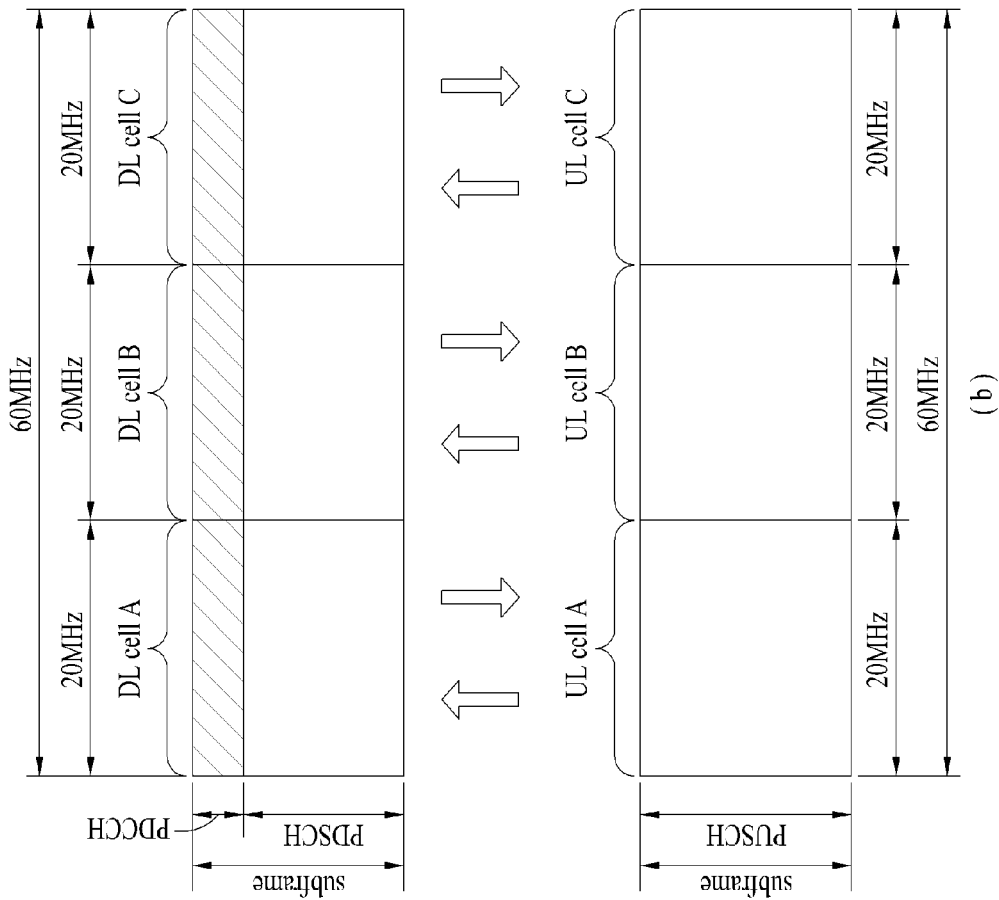
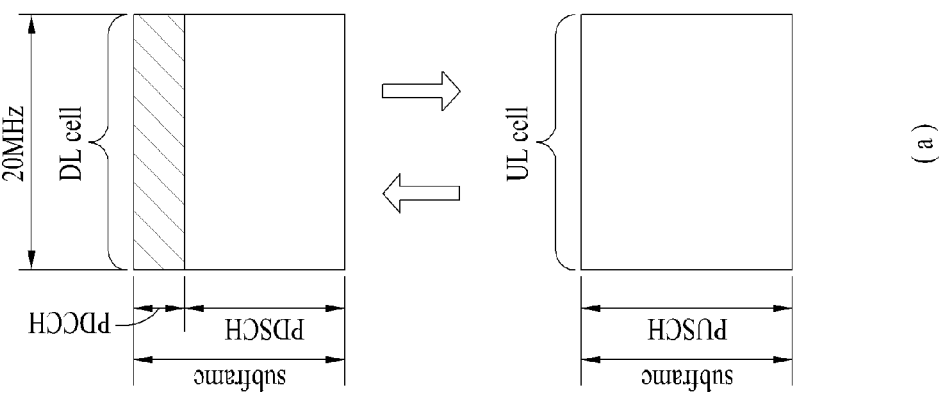

METHOD FOR TRANSMITTING CONTROL INFORMATION ON LOW-COST MACHINE-TYPE COMMUNICATION, AND APPARATUS FOR SUPPORTING SAME

CROSS REFERENCE TO RELATED APPLICATIONS

This application is the National Phase of PCT International Application No. PCT/KR2013/003797, filed on May 2, 2013, which claims priority under 35 U.S.C. 119(e) to U.S. Provisional Application No. 61/641,844, filed on May 2, 2012, all of which are hereby expressly incorporated by reference into the present application.

TECHNICAL FIELD

The present invention relates to a wireless communication system, and more particularly, to a method of transmitting downlink control information for low-cost machine-type communication (MTC) and an apparatus therefor.

BACKGROUND ART

A wireless communication system is widely disseminating to provide various kinds of communication services such as an audio, data and the like. In general, a wireless communication system corresponds to a multiple access system capable of supporting communication with multiple users by sharing available system resources (bandwidth, transmit power and the like). Examples of the multiple access system include a CDMA (code division multiple access) system, a FDMA (frequency division multiple access) system, a TDMA (time division multiple access) system, an OFDMA (orthogonal frequency division multiple access) system, an SC-FDMA (single carrier frequency division multiple access) system, and the like.

As a next system of LTE-A (long term evolution-advanced), a low-cost/low-specification terminal is considered to be configured as a terminal mainly performing data communication such as reading a meter, measuring a water level, utilizing a surveillance camera, reporting inventory of a vending machine and the like. This sort of terminal is commonly called a MTC (machine type communication) terminal for clarity. In case of a MTC device, since an amount of data transmitted by the MTC device is small and transmission and reception of up/downlink data occurs from time to time, it would be efficient to lower a price of a terminal and reduce battery consumption of the terminal in accordance with the low data transmission rate. In order for such a simplified structure as the MTC device to easily search for and receive control information, it is necessary to perform a study on a new method of transmitting and receiving the control information.

DISCLOSURE OF THE INVENTION

Technical Tasks

One object of the present invention is to provide a method of supporting an operation of a low-cost machine-type communication (MTC).

Another object of the present invention is to provide a communication method transmitting downlink control information for a MTC device to which a downlink bandwidth narrower than an uplink bandwidth is allocated.

The other object of the present invention is to provide an apparatus supporting the aforementioned methods.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The present invention provides a method of transmitting downlink control information for a low-cost machine-type communication (MTC) used in a wireless communication system and an apparatus therefor.

To achieve these and other advantages and in accordance with the purpose of the present invention, as embodied and broadly described, according to one embodiment, a method of transmitting an uplink signal, which is transmitted by a low-cost machine-type communication (MTC) device, includes the steps of receiving a uplink grant signal including resource allocation information and transmitting the uplink signal via PUSCH (physical uplink shared channel) using at least one RB determined based on the maximum number of RBs (resource blocks) capable of being allocated to the MTC device and the resource allocation information, wherein the resource allocation information indicates one or more RBs for the PUSCH within the maximum number of RBs capable of being allocated to the MTC device and wherein the maximum number of RBs capable of being allocated to the MTC device is configured to be smaller than the total number of RBs in a system band supported by an eNode B (eNB).

To further achieve these and other advantages and in accordance with the purpose of the present invention, according to a different embodiment, a low-cost machine-type communication (MTC) device transmitting an uplink signal includes a radio frequency (RF) unit configured to transmit/receive a signal and a processor configured to control the RF unit, the processor configured to control the RF unit to receive a uplink grant signal including resource allocation information, the processor configured to control the RF unit to transmit the uplink signal via PUSCH (physical uplink shared channel) using at least one RB determined based on the maximum number of RBs (resource blocks) capable of being allocated to the MTC device and the resource allocation information, wherein the resource allocation information indicates one or more RBs for the PUSCH within the maximum number of RBs capable of being allocated to the MTC device and wherein the maximum number of RBs capable of being allocated to the MTC device is configured to be smaller than the total number of RBs in a system band supported by an eNode B (eNB).

To further achieve these and other advantages and in accordance with the purpose of the present invention, according to a further different embodiment, a method of receiving an uplink signal, which is received by an eNode B (eNB) from a low-cost machine-type communication (MTC) device, includes the steps of transmitting an uplink grant signal based on the maximum number of RBs capable of being allocated to the MTC device and receiving an uplink signal via PUSCH (physical uplink shared channel) corresponding to the uplink grant signal from the MTC device, wherein the uplink grant signal includes resource allocation information indicating one or more RBs for the PUSCH within the maximum number of RBs capable of being allocated to the MTC device, wherein the uplink signal is received via the PUSCH (physical uplink shared channel) using at least one or more RBs determined based on the maximum number of RBs capable of being allocated to the MTC device and the resource allocation information and wherein the maximum number of RBs capable of being allocated to the MTC device is configured to be smaller than the total number of RBs in a system band supported by an eNode B (eNB).

To further achieve these and other advantages and in accordance with the purpose of the present invention, according to a further different embodiment, an eNode B (eNB) receiving an uplink signal from a low-cost machine-type communication (MTC) device in a wireless communication includes a radio frequency (RF) unit configured to transmit/receive a signal and a processor configured to control the RF unit, the processor configured to control the RF unit to transmit an uplink grant signal based on the maximum number of RBs capable of being allocated to the MTC device, the processor configured to control the RF unit to receive an uplink signal via PUSCH (physical uplink shared channel) corresponding to the uplink grant signal from the MTC device, wherein the uplink grant signal includes resource allocation information indicating one or more RBs for the PUSCH within the maximum number of RBs capable of being allocated to the MTC device, wherein the uplink signal is received via the PUSCH (physical uplink shared channel) using at least one or more RBs determined based on the maximum number of RBs capable of being allocated to the MTC device and the resource allocation information and wherein the maximum number of RBs capable of being allocated to the MTC device is configured to be smaller than the total number of RBs in a system band supported by an eNode B (eNB).

In each embodiment of the present invention, a downlink bandwidth assigned to the MTC device can be configured to be smaller than a bandwidth of the system band.

In each embodiment of the present invention, the PUSCH may use at least one or more RBs determined based on start position information of an RB capable of being allocated to the PUSCH, the maximum number of RBs capable of being allocated to the MTC device and the resource allocation information.

In each embodiment of the present invention, the maximum number of RBs capable of being allocated to the MTC device may have a value identical to one selected from the group consisting of the number of RBs included in a downlink bandwidth assigned to the MTC device, a number resulted from multiplying the number of RBs included in the downlink bandwidth assigned to the MTC device by a prescribed ratio, the number of RBs included in an MTC cell-specific downlink bandwidth corresponding to a downlink bandwidth commonly assigned to at least one or more MTC devices belonging to one cell and a number resulted from multiplying the number of RBs included in the MTC cell-specific downlink bandwidth corresponding to the downlink bandwidth commonly assigned to at least one or more MTC devices belonging to one cell by a prescribed ratio.

It is to be understood that both the foregoing general description and the following detailed description are exemplary and explanatory and are intended to provide further explanation of the invention as claimed.

Advantageous Effects

According to embodiments of the present invention, there exist following effects.

According to the embodiments of the present invention, it is able to lower a price of an MTC device and reduce power consumption of the MTC device in accordance with a transmission rate of data transmitted and received by the MTC device.

Effects obtainable from the present invention may be non-limited by the above mentioned effect. And, other unmentioned effects can be clearly understood from the following description by those having ordinary skill in the technical field to which the present invention pertains. In particular, unintended effects can be inferred from the present invention by those having ordinary skill in the technical field to which the present invention pertains from the embodiments of the present invention as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining a single carrier system and a multi-carrier system;

BEST MODE

Mode for Invention

Figure 1:
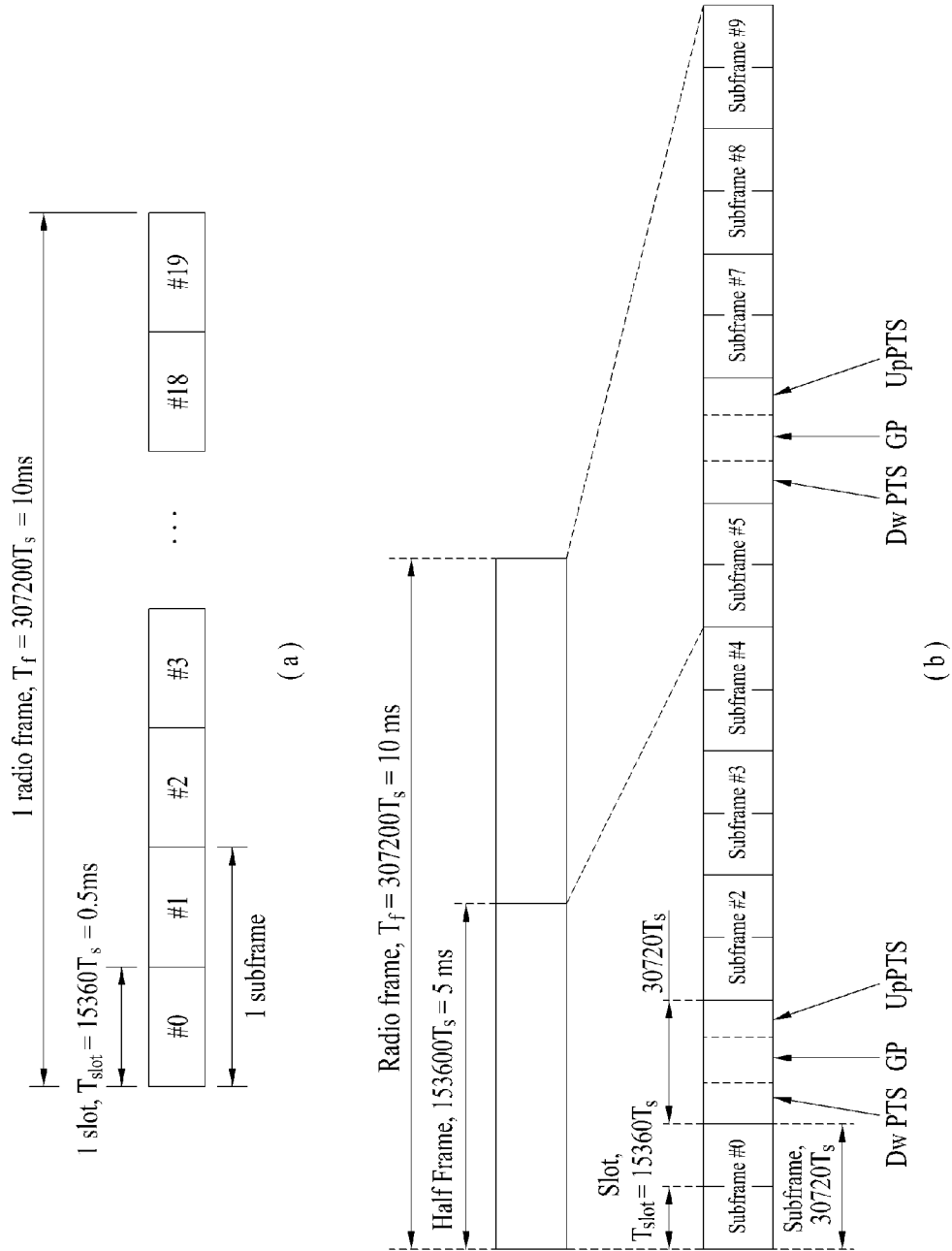
FIG. 1 is a diagram for an example of a radio frame structure used in a wireless communication system.

The present invention discloses a method of transmitting various downlink control information for low-cost machine-type communication (MTC) used in a wireless communication system and an apparatus therefor.

Following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In explaining drawings, a procedure, a step or the like capable of making an idea of the present invention to be unclear is not described. And, a procedure or a step capable of being understood by a level of those who skilled in the art is not described either.

In the present invention, a node indicates a fixed point capable of transceiving a radio signal with a user equipment by performing communication. An eNB (eNode B) of various forms can be used as a node irrespective of a name of the eNB. For instance, a BS, a NB, an eNB, a pico-cell eNB (PeNB), a home eNB (HeNB), a relay, a repeater and the like may become a node. Moreover, a node does not necessarily to be an eNB. For instance, a radio remote head (RRH) or a radio remote unit (RRU) may become a node. The RRH and the RRU have a power level lower than that of an eNB in general. Since the RRH or RRU (RRH/RRU) is generally connected with the eNB via a dedicated line such as an optical cable and the like, coordinated communication performed by both the RRH/RRU and the eNB can be more smoothly performed compared to coordinated communication performed by eNBs connected to each other via a radio circuit. At least one antenna is installed in one node. The antenna may indicate a physical antenna, an antenna port, a virtual antenna or an antenna group. A node can also be called a point.

In this specification, embodiments of the present invention are described centering on the data transmission/reception relations between a base station and a mobile station. In this case, the base station has a meaning of a terminal node of a network directly communicating with a mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other network nodes except the base station. 'Base station (BS)' may be substituted with such a terminology as a fixed station, a Node B, an eNode B (eNB), an advanced base station (ABS), an access point (AP) and the like.

And, in embodiments of the present invention, an MTC device may be substituted with such a terminology as a terminal, a user equipment (UE), an MS (mobile station), an SS (subscriber station), an MSS (mobile subscriber station), a mobile terminal, an AMS (advanced mobile station, or the like.

A transmitting end indicates a fixed and/or mobile node providing a data service or an audio service and a receiving end indicates a fixed and/or mobile node receiving a data service or an audio service. Hence, a mobile station becomes a transmitting end and a base station becomes a receiving end in UL. In the same manner, a mobile station becomes a receiving end and a base station becomes a transmitting end in DL.

Embodiments of the present invention may be supported by the standard documents disclosed in at least one of wireless communication systems including IEEE 802.xx system, 3GPP (3$^{rd}$ generation partnership project) system, 3GPP LTE system and 3GPP2 system. In particular, the embodiments of the present invention may be supported by the standard documents including 3GPP TS 36.211, 3GPP TS 36.212, 3GPP 36.213 and 3GPP TS 36.321. In particular, the steps or parts, which are not explained to clearly reveal the technical idea of the present invention, in the embodiments of the present invention may be supported by the above documents. Moreover, all terminologies disclosed in this document may be supported by the above standard documents.

Reference will now be made in detail to the preferred embodiments of the present invention, examples of which are illustrated in the accompanying drawings. The detail explanation described in the following with reference to attached drawings intends to explain an example of embodiment of the present invention. The explanation does not intend to show a unique embodiment capable of being implemented by the present invention.

Specific terminologies used in the embodiments of the present invention are provided to help understand the present invention and the use of the specific terminologies can be modified into a different form in a range of not deviating from the technical idea of the present invention.

The following description of embodiments of the present invention may be usable for various wireless communication systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

UTRA is a part of UMTS (Universal Mobile Telecommunications System). 3GPP (3$^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. For clarity, embodiments of the present invention mainly concerns 3GPP LTE/LTE-A. Yet, the technical characteristic of the present invention may also be applied to IEEE 802.16 e/m system and the like.

A user equipment receives information from a base station in DL and transmits information to the base station in UL in a wireless communication system. The information transceived between the user equipment and the base station includes various control information and there exist various physical channels according to a type/usage of the information transmitted and received by the user equipment and the base station.

FIG. 1 is a diagram for an example of a radio frame structure used in a wireless communication system.

FIG. 1(a) shows a FDD (frequency division duplex) frame structure used in 3GPP LTE/LTE-A system and FIG. 1(b) shows a TDD (time division duplex) frame structure used in 3GPP LTE/LTE-A system.

Referring to FIG. 1, a radio frame used in 3GPP LTE/LTE-A system has a length of 10 ms (307200 $T_s$) and is constructed with 10 subframes in equal size. A number can be provided to each of the 10 subframes in one radio frame. In this case, $T_s$ indicates a sampling time and is represented as $T_s=1/(2048\times15$ kHz$)$. Each subframe has a length of 1 ms and is constructed with 2 slots. A number can be sequentially provided to 20 slots in one radio frame from 0 to 19. Each slot has a length of 0.5 ms. Time taken for transmitting one subframe is defined as a transmission time interval (TTI). A time resource can be distinguished from each other according to a radio frame number (or radio frame index), a subframe number (or subframe index), a slot number (or slot index) or the like.

A radio frame can be differently configured according to a duplex mode. For instance, since DL transmission and UL transmission are distinguished from each other by frequency in the FDD mode, a radio frame includes either a DL subframe or a UL subframe for a specific frequency band. Since DL transmission and UL transmission are distinguished from each other by time in the TDD mode, a radio frame includes both a DL subframe and a UL subframe for a specific frequency band.

Table 1 shows an example of DL-UL configuration of subframes belonging to one radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 2:
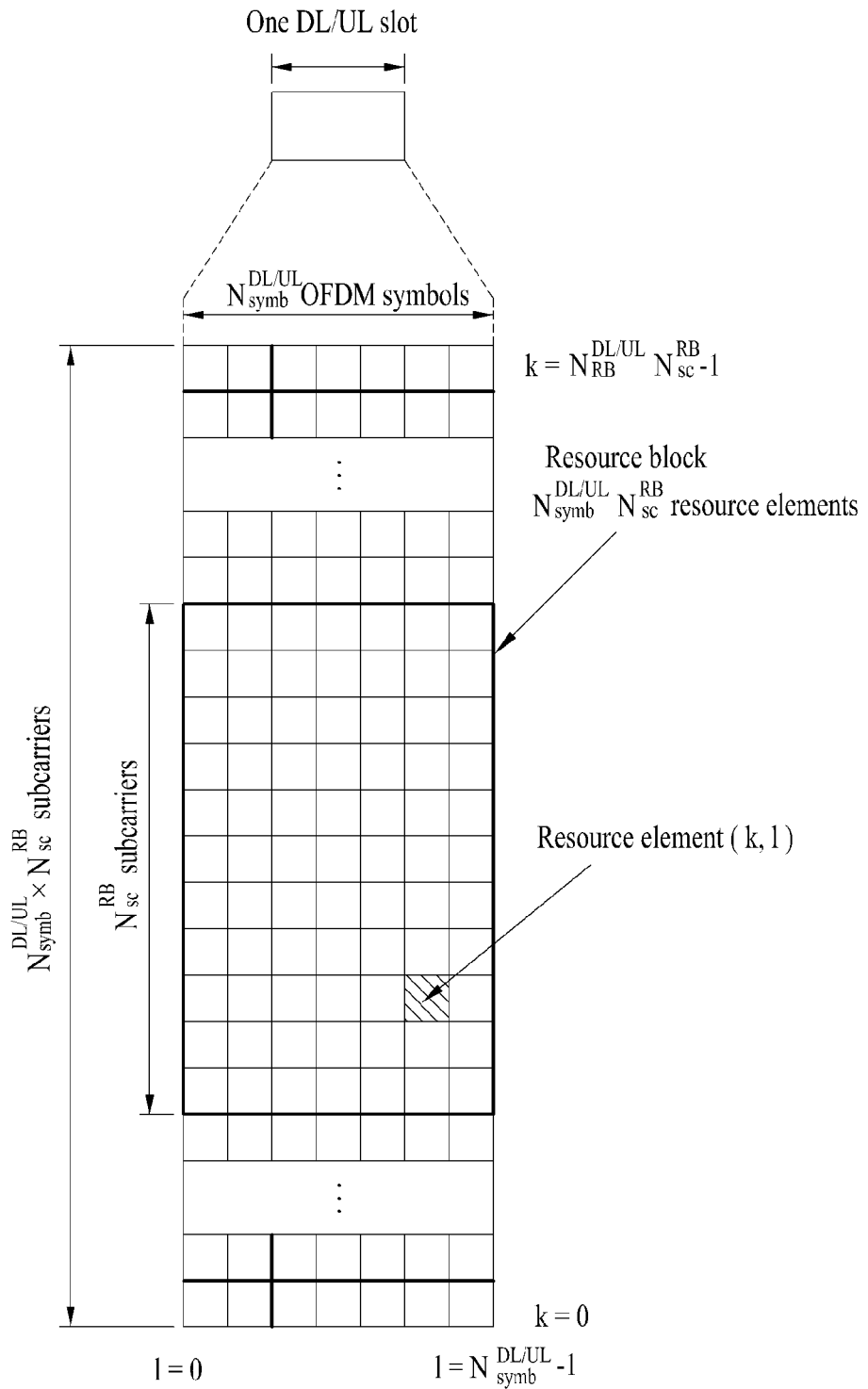
FIG. 2 is a diagram for an example of a downlink/uplink (DL/UL) slot structure used in a wireless communication structure.

In Table 1, D, U and S indicate a DL subframe, a UL subframe and a special subframe, respectively. The special subframe includes 3 fields including DwPTS (downlink pilot timeslot), GP (guard period) and UpPTS (uplink pilot timeslot). The DwPTS is a time interval reserved for DL transmission and the UpPTS is a time interval reserved for UL transmission. Table 2 shows an example of configuration of a special subframe.

spond to one symbol period. Referring to FIG. 2, a signal transmitted from each slot can be represented by a resource grid consisting of $N^{DL/UL}_{RB}*N^{RB}_{SC}$ number of subcarriers and $N^{DL/UL}_{symb}$ number of OFDM symbols. In this case, $N^{DL}_{RB}$ indicates the number of resource block (RB) in a DL slot and $N^{UL}_{RB}$ indicates the number of resource block (RB) in a UL slot. The $N^{DL}_{RB}$ and $N^{UL}_{RB}$ are dependent of DL transmission bandwidth and UL transmission bandwidth, respectively. $N^{DL}_{symb}$ indicates the number of OFDM symbols in a DL slot and $N^{UL}_{symb}$ indicates the number of OFDM symbols in a UL slot. $N^{RB}_{SC}$ indicates the number of subcarriers included in one RB.

An OFDM symbol can be named an OFDM symbol, an SC-FDM symbol or the like according to a multi-access scheme. The number of OFDM symbols included in one slot may vary according to a channel bandwidth or a CP (cyclic prefix) length. For instance, in case of using a normal CP, one slot includes 7 OFDM symbols. On the contrary, in case of using the extended CP, one slot includes 6 OFDM symbols. In FIG. 2, for clarity, an example of a subframe in which 7 OFDM symbols are included is shown. Yet, embodiments of the present invention can also be applied to subframes including different number of OFDM symbols in a same manner. Referring to FIG. 2, each OFDM symbol includes $N^{DL/UL}_{RB}*N^{RB}_{SC}$ number of subcarriers in frequency domain. A type of a subcarrier can be classified into a data subcarrier for transmitting data, a reference signal subcarrier for transmitting a reference signal and a null subcarrier for a guard band and a direct current (DC) field. The null subcarrier for the DC field corresponds to a subcarrier remained in an unused state and is mapped to carrier frequency (f0) in a process of generating an OFDM signal or a process of upconverting frequency. A carrier frequency is also called a center frequency.

One RB is defined by $N^{DL/UL}_{symb}$ number (e.g., 7) of contiguous OFDM symbols in time domain and is defined by $N^{RB}_{SC}$ number (e.g., 12) of contiguous subcarriers in frequency domain. For reference, a resource consisting of one OFDM symbol and one subcarrier is called a resource

TABLE 2

| | Normal cyclic prefix in downlink | | | Extended cyclic prefix in downlink | | |
|---|---|---|---|---|---|---|
| | | UpPTS | | | UpPTS | |
| Special subframe config-uration | DwPTS | Normal cyclic prefix in uplink | Extended cyclic prefix in uplink | DwPTS ee | Normal cyclic prefix in uplink | Extended cyclic prefix in uplink |
| 0 | 6592 · T$_s$ | 2192 · T$_s$ | 2560 · T$_s$ | 7680 · T$_s$ | 2192 · T$_s$ | 2560 · T$_s$ |
| 1 | 19760 · T$_s$ | | | 20480 · T$_s$ | | |
| 2 | 21952 · T$_s$ | | | 23040 · T$_s$ | | |
| 3 | 24144 · T$_s$ | | | 25600 · T$_s$ | | |
| 4 | 26336 · T$_s$ | | | 7680 · T$_s$ | 4384 · T$_s$ | 5120 · T$_s$ |
| 5 | 6592 · T$_s$ | 4384 · T$_s$ | 5120 · T$_s$ | 20480 · T$_s$ | | |
| 6 | 19760 · T$_s$ | | | 23040 · T$_s$ | | |
| 7 | 21952 · T$_s$ | | | — | — | — |
| 8 | 24144 · T$_s$ | | | — | — | — |

FIG. 2 is a diagram for an example of a downlink/uplink (DL/UL) slot structure used in a wireless communication structure. In particular, FIG. 2 shows a resource grid structure of 3GPP LTE/LTE-A system. There exists one resource grid per antenna port.

Referring to FIG. 2, a slot includes a plurality of OFDM (orthogonal frequency division multiplexing) symbols in time domain and includes a plurality of resource blocks (RBs) in frequency domain. An OFDM symbol may correelement or a tone. Hence, one RB is constructed with $N^{DL/UL}_{RB}*N^{RB}_{SC}$ number of resource elements. Each of the resource elements belonging to a resource grid can be uniquely defined by an index pair (k, 1) in one slot. 'k' corresponds to an index provided from 0 to $N^{DL/UL}_{RB}*N^{RB}_{SC}-1$ in frequency domain and '1' corresponds to an index provided from 0 to $N^{DL/UL}_{symb}-1$ in time domain.

While occupying $N^{RB}_{SC}$ number of contiguous identical subcarriers in one subframe, one of 2 RBs is positioned at one of 2 slots of the subframe and another RB is positioned at another slot of the subframe. In this case, the 2 RBs are called a physical resource block (PRB) pair. The 2 RBs included in the PRB pair have an identical PRB number (or PRB index).

Figure 3:
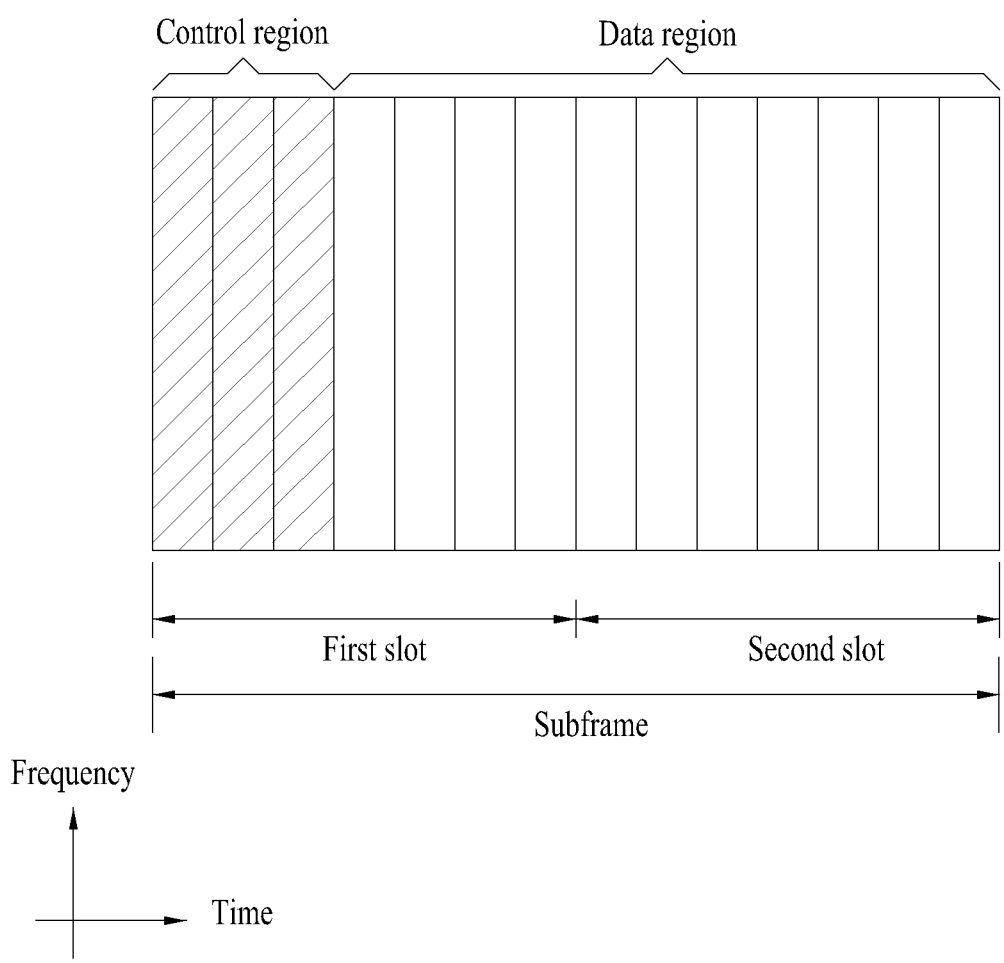
FIG. 3 is a diagram for an example of a DL subframe structure usable in embodiments of the present invention.

FIG. 3 is a diagram for an example of a DL subframe structure usable in embodiments of the present invention.

Maximum 3 OFDM symbols situated in a head part of a first slot of one subframe correspond to a control region to which control channels are assigned. The rest of OFDM symbols correspond to a data region to which PDSCH (physical downlink shared channel) is assigned.

Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols (i.e., a size of a control region) used for transmitting a control channel in the subframe. The PHICH carries ACK (acknowledgement)/NACK (none-acknowledgement) signal in response to UL HARQ (hybrid automatic repeat request). In particular, the ACK/NACK signal for UL data transmitted by a user equipment (UE) is transmitted on the PHICH.

Control information carried on the PDCCH is called downlink control information (hereinafter abbreviated DCI). The DCI includes resource allocation information for a UE or a UE group and different control information.

A transmit format and resource allocation information of a DL shared channel (DL-SCH) is called DL scheduling information or a DL grant. A transmit format and resource allocation information of a UL shared channel (UL-SCH) is called UL scheduling information or a UL grant. A size and usage of DCI carried on one PDCCH vary according to a DCI format and the size of the DCI may vary in accordance with a coding rate. According to current 3GPP LTE system, a format 0 and 4 are defined for UL and various formats including a format 1, 1A, 1B, 1C, 1D, 2, 2A, 2B, 2C, 3, 3A and the like are defined for DL.

Table 3 shows examples of a usage of a DCI format.

TABLE 3

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact resource assignments for PDSCH using rank-1 closed loop precoding |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 3/3A | Power control commands for PUCCH and PUSCH with 2-bit/1-bit power adjustments |
| 4 | Scheduling of PUSCH in one UL carrier with multi-antenna port transmission mode |

A combination of control information selected from such information as a hopping flag, RB allocation, an MCS (modulation and coding scheme), an RV (redundancy version), an NDI (new data indicator), TPC (transmit power control), a cyclic shift DM RS (demodulation reference signal), UL index, CQI (channel quality information) request, DL assignment index, HARQ process number, a TPMI (transmitted precoding matrix indicator), a PMI (precoding matrix indicator) and the like is transmitted to a UE as DL control information. Explanation on a DCI format configuration is described in detail with reference FIG. 6.

A plurality of PDCCHs can be transmitted in a control region and a UE is able to monitor a plurality of the PDCCHs. A BS determines a DCI format in accordance with DCI to be transmitted to the UE and attaches CRC (cyclic redundancy check) to the DCI. The CRC is masked with an identifier (e.g., RNTI (radio network temporary identifier)) in accordance with an owner or usage of PDCCH. If the PDCCH is provided for a specific UE, the CRC can be masked with a unique identifier of the user equipment, i.e., C-RNTI (i.e., cell-RNTI (C-RNTI)). If the PDCCH is provided for a paging message, the CRC can be masked with a paging identifier (e.g., paging-RNTI (P-RNTI)). If the PDCCH is provided for system information (more particularly, for a system information block (SIB)), the CRC can be masked with a system information identifier (e.g., SI-RNTI (system information-RNTI). If the PDCCH is provided for a random access response, the CRC can be masked with RA-RNTI (random access-RNTI). For instance, CRC masking (or scramble) includes a XOR calculation of a CRC and RNTI in a bit level.

PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). For instance, one CCE corresponds to 9 REGs and one REG corresponds to 4 REs. 4 QPSK symbols are mapped to each of the REGs. A resource element (RE) occupied by a reference signal (RS) is not included in the REG. Hence, the number of REGs in a given OFDM symbol varies according to whether an RS exists. A concept of REG is also used for a different DL control channel (i.e., PCFICH and PHICH). A DCI format and the number of DCI bits are determined according to the number of CCEs. For instance, as shown in Table 4, 4 DCI formats are supported.

TABLE 4

| DCI format | Number of CCEs (n) | Number of REGs | Number of DCI bits |
|---|---|---|---|
| 0 | 1 | 0 | 72 |
| 1 | 2 | 18 | 144 |
| 2 | 3 | 36 | 288 |
| 3 | 4 | 72 | 576 |

CCEs are contiguously used in a manner of being numbered. In order to make a decoding process simple, PDCCH, which includes a format consisting of n number of CCEs, can start in CCEs having a number corresponding to a multiple of n only. The number of CCEs used to transmit a specific PDCCH is determined by a base station according to a channel state. For instance, in case of PDCCH for a UE (e.g., UE adjacent to BS) of a good DL channel, it is sufficient enough to transmit the PDCCH by a single CCE. Yet, in case of PDCCH for a UE of a poor channel (e.g., UE situating at a cell boundary), it may require 8 CCEs to obtain sufficient robustness. And, a power level of PDCCH can be adjusted in accordance with a channel state.

In 3GPP LTE/LTE-A system, a CCE set at which PDCCH is able to be positioned for each UE is defined. A CCE set where a UE is able to discover PDCCH of the UE is called a PDCCH search space, simply, a search space (SS). An individual resource capable of transmitting PDCCH in the search space is called a PDCCH candidate. A set of PDCCH candidates, which should be monitored by UE, is defined as the search space.

A search space may have various sizes and can be classified into a dedicated search space and a common search space. The dedicated search space corresponds to a UE-specific search space and is configured for each of individual UEs. The common search space is configured for a plurality of UEs. All of a plurality of the UEs receive information on the common search space. Table 5 shows an example of aggregation levels defining search spaces.

TABLE 5

| Type | Search Space | | Number of PDCCH candidates |
|---|---|---|---|
| | Aggregation level | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

An eNB transmits actual PDCCH (DCI) on a random PDCCH candidate within a search space and a UE monitors the search space to search for the PDCCH (DCI). In this case, to monitor the search space means to make an attempt at decoding each of PDCCHs within the search space according to all monitored DCI formats. The UE monitors a plurality of the PDCCHs and can detect PDCCH of the UE. Basically, since the UE does not know a position in which the PDCCH of the UE is transmitted, the UE makes an attempt at decoding all PDCCHs of a corresponding DCI format in every subframe until PDCCH including an identifier of the UE is detected. This process is called blind detection (blind decoding (BD)).

For instance, assume that specific PDCCH is CRC (cyclic redundancy check) masked with "A" RNTI (radio network temporary identity) and information on data, which is transmitted using a "B" radio resource (e.g., frequency position) and "C" transmission form information (e.g., transport block size, modulation scheme, coding information and the like), is transmitted via a specific DL subframe. A UE monitors PDCCH using RNTI information of the UF, a UE including the "A" RNTI detects PDCCH and receives PDSCH indicated by "B" and "C" via information of received PDCCH.

Meanwhile, in order to maintain calculation load, which is resulted from the blind decoding attempt, to be less than a prescribed level, all DCI formats are not searched at the same time. For instance, a UE is semi-statically configured by upper layer signaling to receive PDSCH data transmission which is signaled via PDCCH according to one of a transmission mode 1 to 9, Table 6 shows an example of DCI formats performing blind decoding performed by a UE in a transmission mode configured to implement a multi-antenna technology and a corresponding transmission mode.

TABLE 6

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |

TABLE 6-continued

| Transmission mode | DCI format | Search Space | Transmission scheme of PDSCH corresponding to PDCCH |
|---|---|---|---|
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 |

In particular, Table 6 shows a relationship between PDCCH configured by C-RNTI and PDSCH. A UE, which is configured to decode PDCCH using a CRC scrambled to the C-RNTI by an upper layer, decodes the PDCCH and corresponding PDSCH according to each combination defined in Table 6. For instance, if a UE is configured by a transmission mode 1 by upper layer signaling, the UE decodes PDCCH using a DCI format 1A and a DCI format 1 and obtains DCI.

In carrier aggregation environment, PDCCH can be transmitted on one or more component carriers and may include resource allocation information on the one or more component carriers. For instance, although PDCCH is transmitted on a single component carrier, the PDCCH may include resource allocation information on one or more PDSCH and PUSCH.

Figure 4:
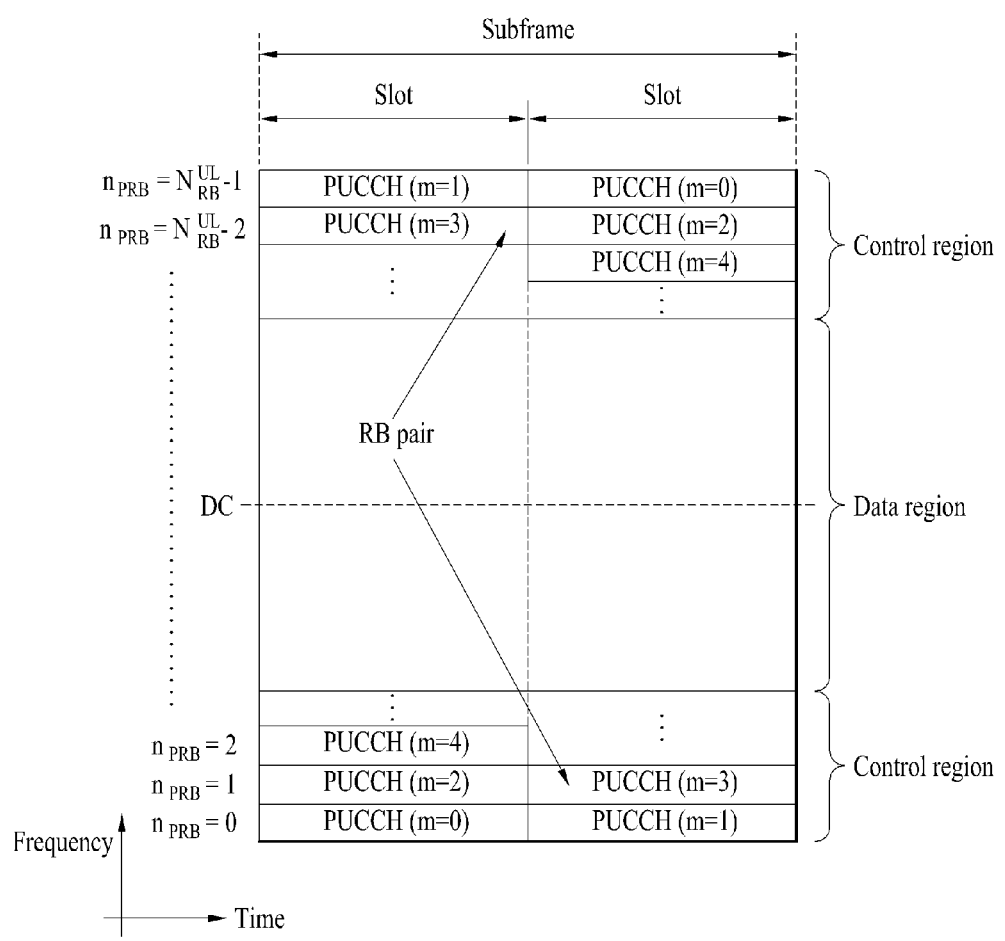
FIG. 4 is a diagram for an example of a UL subframe structure usable in embodiments of the present invention.

FIG. 4 is a diagram for an example of a UL subframe structure usable in embodiments of the present invention.

Referring to FIG. 4, a UL subframe includes a plurality of (e.g., 2) slots. A slot may include SC-FDMA symbols of a different number according to a CP length. The UL subframe is divided into a data region and a control region in frequency domain. The data region includes PUSCH (physical uplink shred channel) and is used to transmit data signal including audio information. The control region includes PUCCH (physical uplink control channel) and is used to transmit UCI (uplink control information). PUCCH includes an RB pair situating at both ends of the data region in a frequency axis and hops on a slot boundary.

In LTE system, a UE does not transmit a PUCCH signal and a PUSCH signal at the same time to maintain a single carrier property. On the contrary, a PUCCH signal and a PUSCH signal can be simultaneously transmitted in an identical subframe according to a transmission mode of a UE in LTE-A system. The PUCCH signal can be transmitted in a manner of performing piggyback the PUCCH signal to the PUSCH signal.

PUCCH for a UE is assigned to an RB pair in a subframe and RBs belonging to the RB pair occupy a subcarrier different from each other in each of 2 slots, respectively. This can be represented as the RB pair to which PUCCH is assigned is frequency hopping on a slot boundary.

Carrier Aggregation

As a demand for high data transmission rate is increasing, a study on a mobile communication system simultaneously using one or more carriers (component carrier (CC) or cell) individually designated for DL or UL is in progress. A system to which carrier aggregation is applied can be considered as a multi-carrier system. In the following description, a UL carrier, which becomes a target of the carrier aggregation, is simply represented as UL CC or a UL cell and a DL carrier is simply represented as a DL CC or a DL cell. In this case, carriers (cell or CC), which become targets of the carrier aggregation, can be configured on contiguous frequencies or non-contiguous frequencies.

FIG. 5 is a diagram for explaining a single carrier system and a multi-carrier system. FIG. 5(a) shows a DL/UL, subframe structure of a legacy single carrier system. FIG. 5(b) shows a DL/UL subframe structure of a multi-carrier system in which 3 CCs (or cells) are aggregated with each other for example.

As shown in FIG. 5(b), a UE can simultaneously monitor and receive DL signals/data on a plurality of DL cells. Yet, when a base station manages N number of DL cells, if a network configures M (M≤N) number of DL cells for the UE, an operation of the UE monitoring the DL signals/data may be limited on the M number of DL cells only. And, if the network configures L (L≤M≤N) number of DL cell(s) as a main DL cell(s), the UE may preferentially monitors/receives DL signal/data of the L number of DL cells. The L number of DL cell(s) can be represented as a DL primary cell (DL P-cell) or a DL anchor cell. The DL P-cell can be UE-specifically or cell-specifically configured.

Meanwhile, a UL primary cell (UL P-cell) can be configured to transmit PUCCH in order for a UE to transmit uplink control information (UCI) in UL. The UL P-cell can also be called a UL anchor cell.

DCI Format

According to current LTE-A (release 10), a DCI format 0, 1, 1A, 1B, 1C, 1D, 2, 2A, 2B, 2C, 3, 3A and 4 are defined. In this case, the DCI format 0, 1A, 3, and 3A are regulated to have an identical message size to reduce the number of blind decoding. The DCI formats can be classified into i) the DCI format 0 and 4 used for UL grant, ii) the DCI formats 1, 1A, 1B, 1C, 1D, 2, 2A, 2B and 2C used for DL scheduling allocation and iii) the DCI formats 3 and 3A used for a power control command in accordance with a usage of control information to transmit.

In the following, control information configuring a DCI format 0 and DCI format 1A are explained with reference to FIG. 6.

Figure 6:
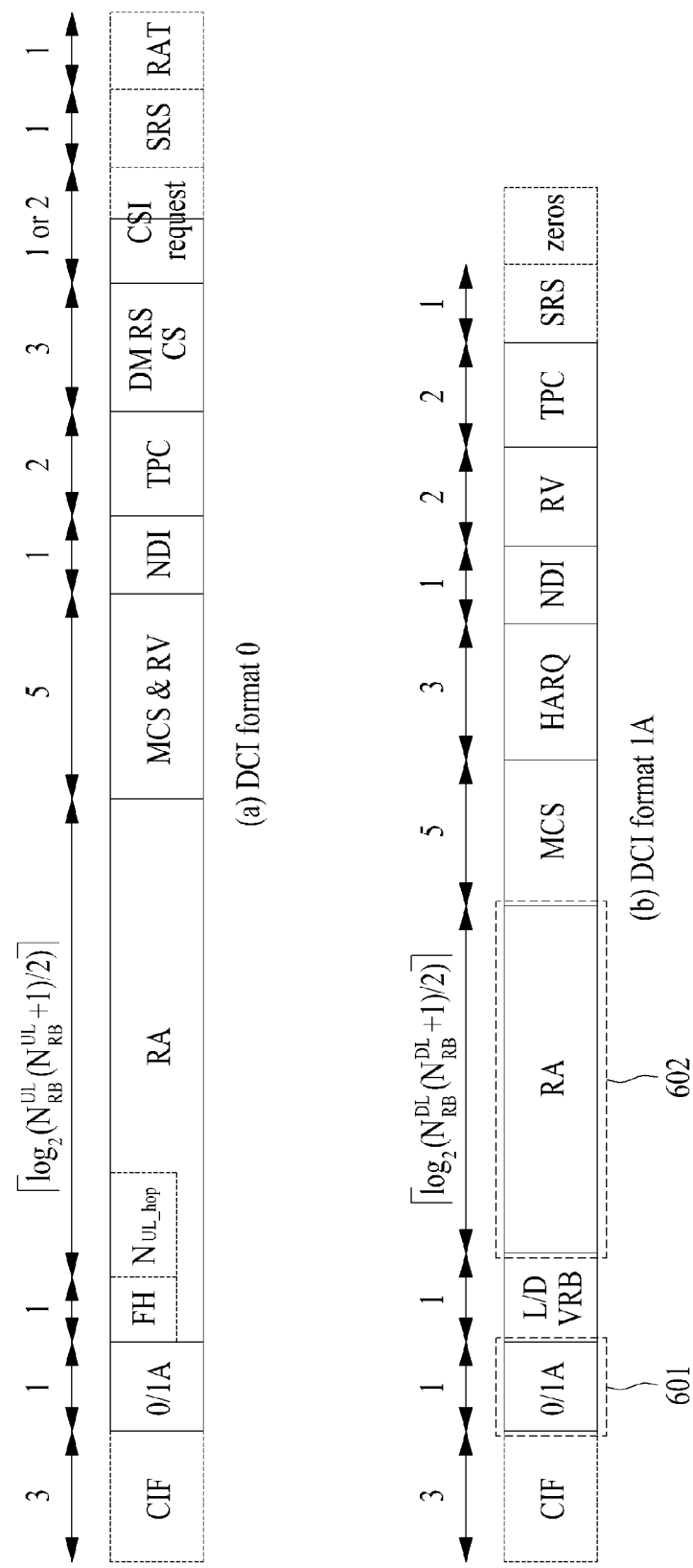
FIG. 6 is a diagram for explaining a problem capable of being occurred in case of using an MTC downlink bandwidth according to embodiment 1 of the present invention.

FIG. 6 shows an example of downlink control information (DCI) format. In particular, FIG. 6(a) shows a structure of a DCI format 0 used for UL scheduling among the DCI formats and FIG. 6(b) shows a structure of a DCI format 1A used for performing compact scheduling that schedules one PDSCH codeword for one cell among the DCI formats. For reference, in this case, the cell indicates not a geographical region but a combination of DL resources and UL resources, i.e., a combination of resources operating on a DL carrier frequency and resources operating on a UL carrier frequency.

For reference, in FIG. 6 and a following drawing, a number written on the top of each field indicates a length of a corresponding field. And, a field represented by a short dotted line corresponds to a field existing under a specific condition. If the specific condition is not satisfied, the corresponding bit may not exist.

The DCI format 0 is used for scheduling of PUSCH within a UL cell. The UL cell indicates resources operating on a UL carrier frequency. Referring to FIG. 6, information shown in Table 7 in the following can be transmitted by the DCI format 0.

TABLE 7

| Field | Number of bits |
| --- | --- |
| Carrier indicator (CIF) | 1 or 3 |
| Flag for format 0/format 1A differentiation (0/1A) | 1 |
| Frequency hopping flag (FH) | 1 |
| Hopping resource allocation (NUL_hop) | NUL_hop |
| Resource block assignment (RA) | $\lceil \log_2(N_{RB}^{UL}(N_{RB}^{UL}+1)/2) \rceil - N_{UL\_hop}$ |
| Modulation and coding scheme and redundancy version (MCS & RV) | 5 |
| New data indicator (NDI) | 1 |
| TPC command for scheduled PUSCH (TPC) | 2 |
| Cyclic shift for DM RS and OCC index (DM RS CS) | 3 |
| CSI request (CSI request) | 1 or 2 |
| SRS request (SRS) | 0 or 1 |
| Resource allocation type (RAT) | 0 or 1 |

The DCI format 1A is used for compact scheduling of one PDSCH within a cell and a random access procedure which is initiated by a PDCCH order. Referring to FIG. 6(b), information shown in Table 8 in the following can be transmitted by the DCI format 1A.

TABLE 8

| Field | Number of bits |
| --- | --- |
| Carrier indicator (CIF) | 1 or 3 |
| Flag for format 0/format 1A differentiation (0/1A) | 1 |
| Localized/Distributed VRB assignment flag | 1 |
| Resource block assignment (RA) | $\lceil \log_2(N_{RB}^{DL}(N_{RB}^{DL}+1)/2) \rceil$ |
| Modulation and coding scheme (MCS) | 5 |
| HARQ process number (HARQ) | 3 (FDD), 4 (TDD) |
| New data indicator (NDI) | 1 |
| Redundancy version (RV) | 2 |
| TPC command for scheduled PUSCH (TPC) | 2 |
| SRS request (SRS) | 0 or 1 |
| Zeros (zeros) | payload size of format 0-payload size of format 1A |

In principle, DCI should be configured according to a corresponding format. If it does not satisfy a pre-defined condition known to both an eNB and a UE, a field in a DCI format cannot be deleted and a length of the field cannot be reduced as well. For reference, a carrier aggregation technology using a wider bandwidth to transmit/receive a radio signal in a manner of aggregating a plurality of UL/DL frequency blocks can be used in 3GPP LTE-A system. A 3-bit length CIF field within a DCI format exists only when carrier aggregation is configured for a UE. If the carrier aggregation is not configured, the CIF field does not exist in DCI for the UE. In particular, since a UE in which the carrier aggregation is not configured knows that DCI for the UE is configured without a CIF field, the UE can obtain the DCI in a manner of decoding a DL signal received on PDCCH in a form without the CIF field. As a different example, since a UE knows a UL bandwidth $N^{UL}_{RB}$ and a DL bandwidth $N^{DL}_{RB}$ allocated to the UE, the UE is able to know how many bits are included in an RA field within DCI. As a further different example, referring to FIG. 7, a 2-bit length CSI request field is applied only when UEs including one or more DL cells and a corresponding DCI format are mapped to a US-specific search space specified (given) by C-RNTI. Hence, a UE configured by a single DL cell decodes DCI under an assumption that a length of the CSI request field corresponds to 1 bit. The UE does not need to perform decoding on DCI, which is assume that the length of the CSI request field corresponds to 2 bits, in a common search space. In particular, once a system of a UE is configured according to a specific system configuration, DCI is configured in a manner that fields of a determined DCI format exist in a pre-defined position in a pre-defined length until the system of the UE is reconfigured. An eNB configures DCI according to the determined DCI format and transmit the DCI to a UE and the UE makes an attempt at decoding the DCI according to the determined DCI format.

In case of a DCI format 1, most of control information is similar to that of a DCI format 1A. Yet, the DCI format 1A is associated with contiguous resource allocation. On the contrary, the DCI format 1 supports non-contiguous resource allocation. Hence, since the DCI format 1 further includes a resource allocation header, control signaling overhead of the DCI format 1 somewhat increases as a tradeoff of increasing resource allocation flexibility.

Recently, machine type communication (hereinafter abbreviated MTC) is coming to the fore as one of important standardization issues. The MTC means information exchange performed between a machine and a base station without a human involvement or with minimum involvement of a human. For instance, the MTC can be used for data communication such as reading a meter, measuring a water level, utilizing a surveillance camera, reporting inventory of a vending machine and the like. Moreover, the MTC can be used for a process of updating an automatic application for a plurality of UEs sharing a prescribed property or a firmware. The MTC means information exchange performed between a machine and a base station without a human involvement. Meanwhile, in the aforementioned legacy LTE/LTE-A system, legacy UEs use a UL bandwidth and a DL bandwidth identical to a system bandwidth in size supported by an eNB. According to embodiments of the present invention, if an eNB or an upper node assigns a UL/DL, bandwidth to an MTC device, the eNB or the upper node can inform the MTC device of the UL/DL bandwidth assigned via upper layer signaling. Or, if there is a predetermined UL/DL bandwidth between the eNB and the MTC device, it may not necessary to have a separate signaling for the UL/DL bandwidth between the eNB and the MTC device.

In case of a MTC device, most of UEs has a small amount of transmission data and operates in a manner of belonging to one cell. Hence, if an amount of data to transmit and receive is small, it is not appropriate for the MTC device to use a bandwidth identical to that of legacy UEs. Since the MTC device has a small amount of transmitted and received data and the transmission and reception intermittently occurs, it may be more efficient to lower price of the device and reduce battery consumption. Hence, according to one embodiment of the present invention, baseband complexity of the MTC device is considerably reduced by making an operation frequency bandwidth of the MTC device small, thereby lowering the price of the device and reducing the battery consumption. Hence, according to one embodiment of the present invention, unlike legacy UEs supporting a DL bandwidth of maximum 100 RBs, the present invention proposes to use a DL bandwidth smaller than that of the legacy UEs. Although embodiments of the present invention explain the MTC device as an example, it is apparent that the embodiments of the present invention can be identically applied to devices using a DL bandwidth smaller than a system bandwidth supported by an eNB.

Meanwhile, although one embodiment of the present invention proposes the MTC devices to use a DL bandwidth smaller than a system bandwidth, assume that the system bandwidth supported by an eNB is supported for UL as it is. Or, all of the embodiments of the present invention can be applied to environment that a bandwidth used for DL is smaller than a bandwidth used for UL. In the following description, for clarity, UL/DL bandwidth used by the MTC devices is called an MTC UL/DL bandwidth. In the present invention, the MTC DL bandwidth has a value smaller than a value of the MTC UL bandwidth.

In case of applying a legacy wireless communication system to such devices used in environment that the MTC DL bandwidth is smaller than the MTC UL bandwidth as the MTC devices as it is, there may exist a problem occurred according to the application.

Referring to FIG. 6, if a length of a DCI format 0 used for UL grant and a length of a DCI format 1A used for DL grant are different from each other in a legacy LTE/LTE-A system, the length of the two DCI formats become identical to each other in a manner of performing zero-padding on a DCI format of a shorter length. In order to distinguish two DCI formats of a same length from each other, a 1-bit flag 601 is included in the DCI format 0 and the DCI format 1A to distinguish the DCI format 0 from the DCI format 1A.

In case of using the MTC DL bandwidth, an RB region usable for DL becomes small (the number of RBs $N^{DL}_{RB}$ used for DL is reduced). As the number of RBs used for DL is reduced, a size of a field 602 used for allocating a resource block of the DCI format 1A becomes small. For this reason, a difference between a length of the DCI format 0 and a length of the DCI format 1A increases. In order to solve a problem occurring due to the length difference, the present invention proposes embodiments described in the following. The embodiments described in the following can be applied to not only an MTC device but also all environments including a DL bandwidth smaller than a UL bandwidth.

The embodiments of the present invention provide various methods of transmitting DL control information to an operation of a LTE (Rel-8/9)/LTE-A (Rel-10/11) system based low-cost MTC device. In case of low-cost MTC devices, it is necessary to simplify a hardware structure of an MTC device to reduce cost of manufacturing the device. Hence, in order for the MTC device to easily search for and receive control information with a simplified structure, it is necessary to have a new method of transmitting and receiving the control information. In particular, the low-cost MTC device according to the present invention operates based on a LTE system or a LTE-A system. Hence, the aforementioned contents can be applied to the embodiments of the present invention described in the following.

Embodiment 1—Performing Zero-Padding

If an MTC device uses an MTC DL bandwidth and a length of a DCI format 1A becomes smaller than a length of a DCI format 0, embodiment 1 of the present invention proposes to fill the number of shortage bits of the DCI format 1A with 0 bits (zero-padding).

Yet, according to the embodiment 1 of the present invention, as a difference between a size of the MTC DL bandwidth and a size of the MTC UL bandwidth increases, a length difference between a DCI format 0 and a DCI format 1A also increases. And, as the length difference between the DCI format 0 and the DCI format 1A also increases, if zero-padding is performed on the DCI format 1A, a problem that overhead of the DCI format 1A also increases occurs.

Embodiment 2—Limit on the Number of Maximum UL RBs

As mentioned earlier in the embodiment 1, if zero-padding is performed on the DCI format 1A, overhead of the DCI format 1A occurs. Embodiment 2 of the present invention is proposed to solve the overhead problem. The embodiment 2 proposes to set a limit on a length of the DCI format 0 as well in a manner of setting a limit on the number of RBs capable of being used for PUSCH of an MTC device. Regarding to the embodiment 2 of the present invention, it shall be described with reference to FIG. 7 in the following.

Figure 7:
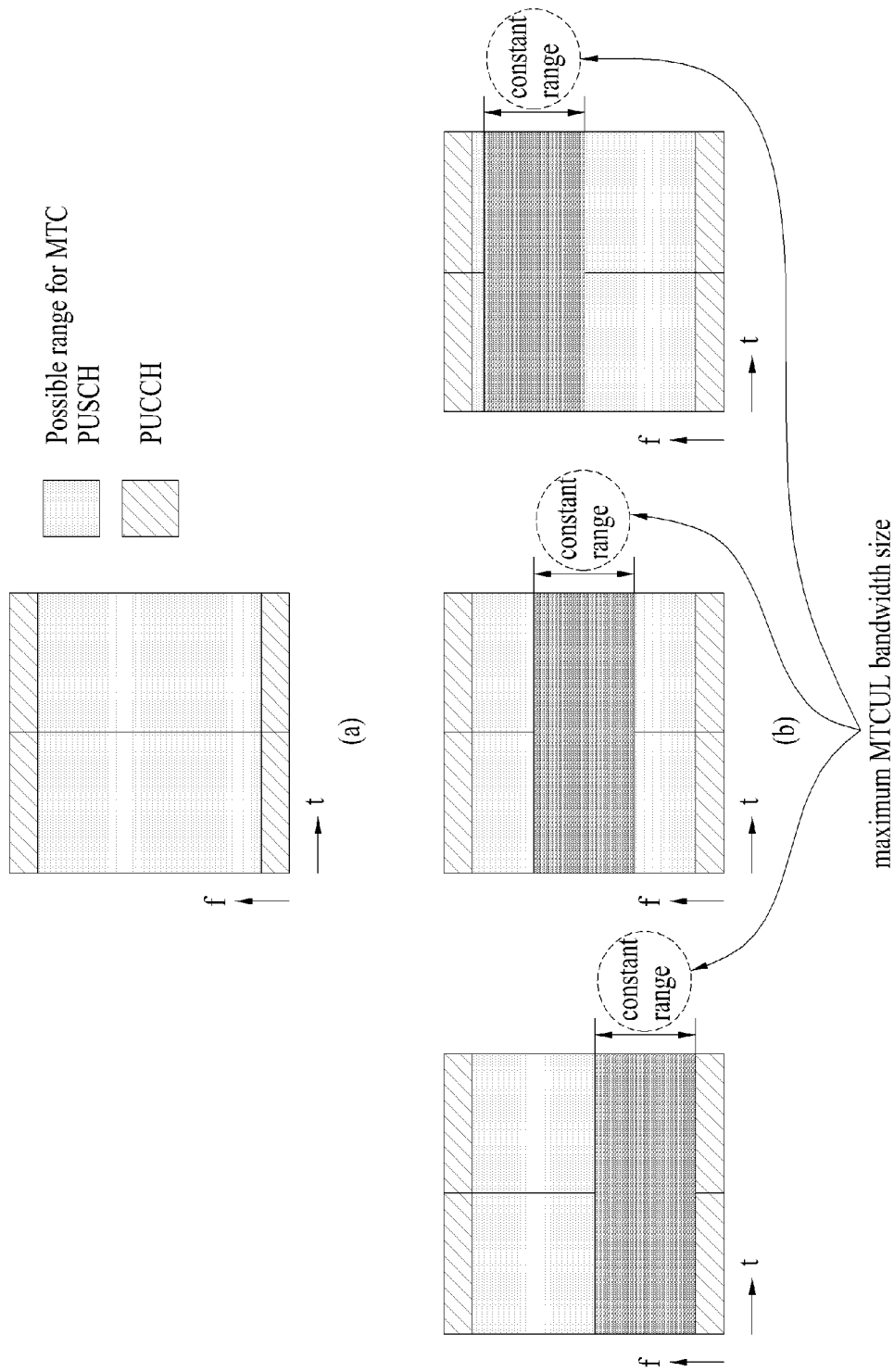
FIG. 7 is a diagram for an example of setting a limit on maximum bandwidth of PUSCH per an MTC device in an uplink subframe structure according to embodiment 2 of the present invention.

FIG. 7 is a diagram for an example of setting a limit on the maximum number of RBs capable of being allocated to PUSCH per an MTC device in an uplink subframe structure of an MTC device according to embodiment 2 of the present invention. A length of a DCI format 0 including a control signal for UL grant becomes longer or shorter by a value of $N^{UL}_{RB}$. As mentioned earlier with reference to FIG. 2, the $N^{UL}_{RB}$ indicates the number of RBs in a UL slot. In order to reduce a length difference between the DCI format 0 and the DCI format 1A, a length of the DCI format 0 should be reduced or a length of the DCI format 1A should be increased. Since the length of the DCI format 1A is restricted by a DL bandwidth, the embodiment 2 of the present invention considers a method of reducing the length of the DCI format 0. To this end, the embodiment 2 of the present invention proposes to set a limit on the value of $N^{UL}_{RB}$ to be less than a constant value. The number of maximum RBs capable of being allocated to PUSCH to set the limit on the value of $N^{UL}_{RB}$ is called $N_{RB}^{PUSCH,\ MTC}$.

Meanwhile, since $N^{UL}_{RB}$ is dependent of a size of a UL transmission bandwidth, setting a limit on the $N^{UL}_{RB}$ value to be less than a constant value may correspond to setting a limit on the size of the UL transmission bandwidth to be less than a constant size. A constant size of a bandwidth capable of being used by a MTC device is called a maximum MTC UL bandwidth size in the following description.

FIG. 7(a) shows a whole PUSCH region capable of being assigned to an MTC device in a UL subframe structure. According to the embodiment 2 of the present invention, although PUSCH for an MTC device can be assigned to a random RB(s) except a PUCCH region, the maximum number of RBs capable of being allocated to PUSCH per one MTC device is limited.

FIG. 7(b) is a diagram for a size of maximum MTC UL bandwidth capable of being assigned to one MTV device according to embodiment 2 of the present invention (3 examples of UL bandwidth used for assigning PUSCH to 3 MTC devices). In case of a normal UE, PUSCH can be assigned to all RBs except PUCCH region in maximum. Yet, according to the embodiment 2 shown in FIG. 7(b), a size of maximum MTC UL bandwidth assigned to a MTV device can be limited by a constant value (in terms of resource allocation, a scheme of setting a limit on a size of a resource allocation region only in a state that there is no limit on a start point of resource allocation). If the maximum MTC UL bandwidth per MTV device is restricted, the maximum number ($N_{RB}^{PUSCH, MTC}$) of RBs capable of being allocated to PUSCH per MTV device is also restricted. The $N_{RB}^{PUSCH, MTC}$ can be determined by one of a plurality of determining schemes described in the following.

- $N_{RB}^{PUSCH, MTC}$ can be configured by the number of RBs allocated to maximum MTC DL bandwidth for an MTC device ($N_{RB}^{PUSCH, MTC}$ is UE-specifically configured).
- $N_{RB}^{PUSCH, MTC}$ can be configured by the number of RBs allocated to an MTC DL bandwidth used for an MTC device in a corresponding cell ($N_{RB}^{PUSCH, MTC}$ is cell-specifically configured).
- $N_{RB}^{PUSCH, MTC}$ can be configured by multiple of K of the number of RBs corresponding to a maximum MTC DL bandwidth for an MTC device in consideration of a case that UL data is relatively bigger than DL data. The K may correspond to a fixed value or a value configured by an eNB ($N_{RB}^{PUSCH, MTC}$ is UE-specifically configured).
- $N_{RB}^{PUSCH, MTC}$ can be configured by multiple of K of the number of RBs allocated to MTC DL bandwidth for an MTC device used in a corresponding cell in consideration of a case that UL data is relatively bigger than DL data. The K may correspond to a fixed value or a value configured by an eNB ($N_{RB}^{PUSCH, MTC}$ is cell-specifically configured).
- $N_{RB}^{PUSCH, MTC}$ can be directly configured by an eNB ($N_{RB}^{PUSCH, MTC} \leq 110$ RBs).
- $N_{RB}^{PUSCH, MTC}$ can be configured by an eNB with a value equal to or smaller than the number of RBs allocated to an MTC DL bandwidth used for an MTC device in a corresponding cell.

The $N_{RB}^{PUSCH, MTC}$ restricted by an eNB according to the aforementioned scheme can be signaled to an MTC device. In this case, the eNB can inform the MTC device of the restricted $N_{RB}^{PUSCH, MTC}$ via upper layer signaling. Or, the $N_{RB}^{PUSCH, MTC}$ can be configured by a value promised in advance between the eNB and the MTC device. As a further different scheme, the eNB can configure the $N_{RB}^{PUSCH, MTC}$ for the MTC device via an information block. Examples of the information block include an MIB (master information block), an SIB (system information block) and the like.

Embodiment 3

As mentioned earlier with reference to the embodiment 1, if zero-padding is performed on a DCI format 1A, overhead of the DCI format 1A occurs. Embodiment 3 is proposed to solve a problem of the overhead. The embodiment 3 proposes to set a limit on not only the maximum number of RBs capable of being used for PUSCH but also a usable RB region. Regarding the embodiment 3 of the present invention, it shall be described with reference to FIG. 8 in the following.

Figure 8:
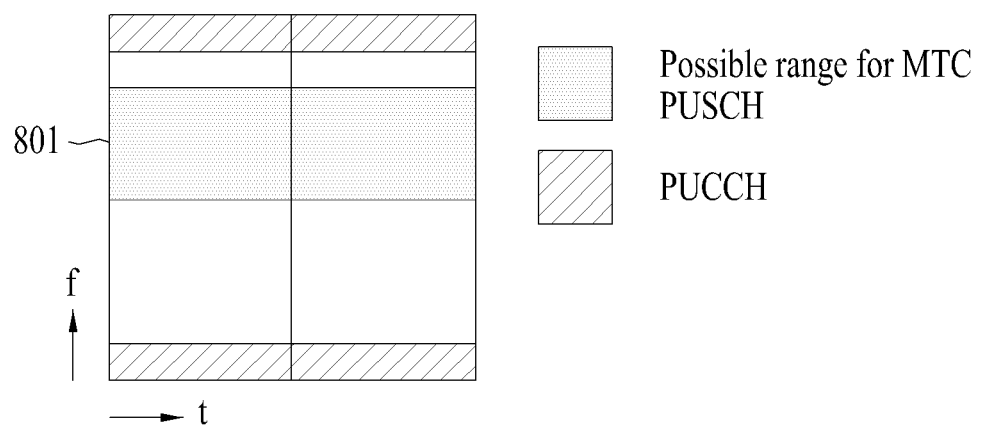
FIG. 8 is a diagram for an example of setting a limit on maximum bandwidth of PUSCH per an MTC device and a position of bandwidth in an uplink subframe structure according to embodiment 3 of the present invention.

FIG. 8 is a diagram for an example of setting a limit on the maximum number of RBs capable of being allocated to PUSCH and a position of a frequency resource in an uplink subframe structure according to embodiment 3 of the present invention.

According to embodiment 3 shown in FIG. 8, a bandwidth of PUSCH capable of being assigned to an MTC device is limited to a constant region 801. The MTC device can transmit PUSCH in the constant region to which a limitation is set only (in terms of resource allocation, a scheme of setting a limit on both a start point of resource allocation and a size of a resource allocation region).

As mentioned in the embodiment 3, a limit on a PUSCH region can be cell-specifically configured or UE-specifically configured. In this case, the PUSCH region allocated for an MTC device is called an MTC PUSCH bandwidth, the maximum number of RBs capable of being allocated to the MTC PUSCH bandwidth is called $N_{RB}^{PUSCH, MTC}$ and the $N_{RB}^{PUSCH, MTC}$ can be determined by one of a plurality of determining schemes described in the following.

- $N_{RB}^{PUSCH, MTC}$ can be configured by the number of RBs allocated to maximum MTC DL bandwidth for an MTC device ($N_{RB}^{PUSCH, MTC}$ is UE-specifically configured).
- $N_{RB}^{PUSCH, MTC}$ can be configured by the number of RBs allocated to an MTC DL bandwidth used for an MTC device in a corresponding cell ($N_{RB}^{PUSCH, MTC}$ is cell-specifically configured).
- $N_{RB}^{PUSCH, MTC}$ can be configured by multiple of K of the number of RBs corresponding to a maximum MTC DL bandwidth for an MTC device in consideration of a case that UL data is relatively bigger than DL data. The K may correspond to a fixed value or a value configured by an eNB ($N_{RB}^{PUSCH, MTC}$ is UE-specifically configured).
- $N_{RB}^{PUSCH, MTC}$ can be configured by multiple of K of the number of RBs allocated to MTC DL bandwidth for an MTC device used in a corresponding cell in consideration of a case that UL data is relatively bigger than DL data. The K may correspond to a fixed value or a value configured by an eNB ($N_{RB}^{PUSCH, MTC}$ is cell-specifically configured).
- $N_{RB}^{PUSCH, MTC}$ can be directly configured by an eNB ($N_{RB}^{PUSCH, MTC} \leq 110$ RBs).
- $N_{RB}^{PUSCH, MTC}$ can he configured by an eNB with a value equal to or smaller than the number of RBs allocated to an MTC DL bandwidth used for an MTC device in a corresponding cell.

In this case, among control information included in a DCI format 0 for an MTC device, the number of bits of resource block assignment and hopping resource allocation field to be used by a UE to transmit PUSCH becomes $\lceil \log_2(N_{RB}^{PUSCH, MTC}(N_{RB}^{PUSCH, MTC}+1)/2) \rceil$.

Embodiment 4

As mentioned earlier with reference to the embodiment 1, if zero-padding is performed on a DCI format 1A, overhead of the DCI format 1A occurs. Embodiment 4 is proposed to solve a problem of the overhead. A method of transmitting control information transmitted to an MTC device according to the embodiment 4 of the present invention proposes the MTC device to receive PDCCH from an eNB via different DCI formats instead of the DCI format 1A.

The MTC device can receive PDCCH from the eNB via a different DCI format except the DCI format 1A. As mentioned earlier with reference to FIG. 6, the number of DCI formats capable of being used for an MTC device per a TM (transmission mode) corresponds to 2. Hence, according to one embodiment of the present invention, the number of DCI formats capable of being used per TM (transmission mode) corresponds to 1 except the DCI format 1A.

According to the embodiment 4, since the DCI format 1A is not transmitted to the MTC device anymore, control information used for distinguishing the DCI format 0 from the DCI format 1A is not necessary anymore. Hence, it is able to eliminate a flag (flag for format 0/format 1A differentiation), which is used for distinguishing the DCI format 0 from the DCI format 1A, from the DCI format 0 transmitted to the MTC device.

Embodiment 5

As mentioned earlier with reference to the embodiment 1, if zero-padding is performed on a DCI format 1A, overhead of the DCI format 1A occurs. Embodiment 5 is proposed to solve a problem of the overhead. A method of transmitting control information transmitted to an MTC device according to the embodiment 5 of the present invention proposes not to use the DCI format 1A and the DCI format 0 at the same time in a subframe which is transmitted to the MTC device (i.e., using either the DCI format 1A or the DCI format 0 in the specific subframe). This is because, if the DCI format 1A and the DCI format 0 are not used at the same time, it is not necessary to match a length of the DCI format 1A with a length of the DCI format 0.

To this end, the embodiment 5 of the present invention proposes to transmit either a DL grant or a UL grant only in the specific subframe for the MTC device An eNB can transmit either a DL grant or a UL grant only to an MTC device in a specific subframe. Since the MTC device already knows which one of the DL grant and the UL grant is to be transmitted in the subframe, the MTC device can monitor the corresponding grant only. The eNB can signal the MTC device on the pre-defined specific subframe via an upper layer signal.

The DCI format 0 and the DCI format 1A are not transmitted at the same time in the specific subframe and the MTV device is able to know a DCI format transmitted in the specific subframe in advance. Hence, since the MTC device is able to monitor the corresponding DCI format only, the MTV device can identify two DCI formats although a length of the DCI format 0 and a length of the DCI format 1A are identically matched with each other.

As a different method of not using the DCI format 1A and the DCI format 0 at the same time in one subframe transmitted to the MTC device according to the embodiment 5 of the present invention, a DL grant is transmitted using a DCI format X (remaining DCI formats except the DCI format 1A) and a UL grant is transmitted using the DCI format 0 while the UL grant and the DL grant are transmitted at the same time in the specific subframe. In particular, either the DCI format 0 or the DCI format 1A can be used only in the specific subframe for the MTC device. When the UL grant is transmitted (transmitted using the DCI format 0), the DCI format 1A cannot be transmitted. When the UL grant is not transmitted, the DCI format 1A can be transmitted.

Hence, the DCI format 0 and the DCI format 1A are not transmitted at the same time in the specific subframe and the MTV device is able to know a DCI format transmitted in the specific subframe in advance. Hence, since the MTC device is able to monitor the corresponding DCI format only, the MTV device can identify two DCI formats although a length of the DCI format 0 and a length of the DCI format 1A are identically matched with each other.

For instance, assume that an eNB can transmit a DL grant using not only the DCI format 1A but also the DCI format X (remaining DCI formats except the DCI format 1A) in case of transmitting the DL grant for an MTC device and the eNB can transmit a UL grant using the DCI format 0 in case of transmitting the UL grant. In order to set a limit on the maximum number of blind decoding, a combination of DCI format types capable of being transmitted (configured in advance) by an eNB via each subframe is described in the following (in examples shown in the following, assume that n and k are different from each other).

Example 1

Subframe #n: transmit DCI format 0
Subframe #k : transmit DCI format 1A or DCI format X Example 2

Subframe #n: transmit DCI format 0 or DCI format X
Subframe #k: transmit DCI format 1A or DCI format X Example 3

Subframe #n : transmit DCI format 0 or DCI format X
Subframe #k : transmit DCI format 1A Embodiment 6

As mentioned earlier with reference to the embodiment 1, if zero-padding is performed on a DCI format 1A, overhead of the DCI format 1A occurs. Embodiment 6 is proposed to solve a problem of the overhead. A method of transmitting control information transmitted to an MTC device according to the embodiment 6 of the present invention proposes to newly define an MTC-dedicated DCI format 1A (DCI format 1A for MTC) and transmit control information using the newly defined MTC-dedicated DCI format 1A. The MTC-dedicated DCI format 1A does not need to perform the zero-padding in consideration of a length of a DCI format 0.

The MTC-dedicated DCI format 1A is used in environment only that a DL bandwidth is smaller than a system bandwidth supported by an eNB. If the DL bandwidth is equal to the system bandwidth supported by the eNB, a normal DCI format 1A can be used. Or, if the DL bandwidth is equal to or less than the system bandwidth supported by the eNB, it is able to use the MTC-dedicated DCI format 1A.

In order to distinguish the MTC-dedicated DCI format 1A form the DCI format 1 and the DCI format 1, as an example, if a length of the MTC-dedicated DCI format 1A is equal to that of the DCI format 0 or that of the DCI format 1, an eNB may perform zero-padding (add one or more zero bits) on the MTC-dedicated format 1A to make the length of the MTC-dedicated DCI format 1A to be different from that of the DCI format 0 or that of the DCI format 1.

As a different example of distinguishing the MTC-dedicated DCI format from the DCI format 0 and the DCI format 1A, first of all, an eNB compares a length of the MTC-dedicated DCI format 1A and a length of the DCI format 0 with each other. If the length of the MTC-dedicated DCI format 1A is equal to the length of the DCI format 0, it may perform zero-padding (add one or more zero bits) on the MTC-dedicated DCI format 1A. If a length of the DCI format 1 is equal to the length of the DCI format 0 or the length of the MTC-dedicated DCI format 1A, it may perform zero-padding (add one or more zero bits) on the DCI format 1 to make the length of the DCI format 1 to be different from the length of the DCI format 0 or the length of the MTC-dedicated DCI format 1A.

As a further different example of distinguishing the MTC-dedicated DCI format from the DCI format 0 and the DCI format 1A, first of all, the eNB configures the length of the MTC-dedicated DCI format 1A to be different from the length of the DCI format 0 and the length of the DCI format 1. Subsequently, the eNB adjusts the length of the DCI format 1 to make the length of the DCI format 1 to be equal to the length of the MTC-dedicated DCI format 1A. The length-adjusted DCI format 1 is called an MTC-dedicated DCI format 1. In order to distinguish the MTC-dedicated DCI format 1 from the MTC-dedicated DCI format 1A, which have an identical length, a flag (flag for format 1/format 1A differentiation field) configured to distinguish the two formats from each other can be added. In this case, if the length of the MTC-dedicated DCI format 1 or the length of the MTC-dedicated DCI format 1A is equal to the length of the DCI format 0, the eNB may perform zero-padding (add one or more zero bits) on the MTC-dedicated DCI format 1 or the MTC-dedicated DCI format 1A to adjust the length of the MTC-dedicated DCI format 1 or the length of the MTC-dedicated DCI format 1A. If the length of the MTC-dedicated DCI format 1 is different from the length of the MTC-dedicated DCI format 1A, the eNB may perform zero-padding (add one or more zero bits) on a shorter length among the length of the MTC-dedicated DCI format 1 and the length of the MTC-dedicated DCI format 1A to make the two lengths identical to each other.

Basically, the MTC-dedicated DCI format 1A may follow a form of the legacy DCI format 1A. Yet, in this case, since the length of the MTC-dedicated DCI format 1A and the length of the DCI format 0 are not equal to the length of the DCI format 0, a flag (flag for format 0/format 1A differentiation) configured to distinguish the DCI format 0 from the DCI format 1A can be eliminated. A DCI format 0 from which the flag (flag for format 0/format 1A differentiation) configured to distinguish the DCI format 0 from the DCI format 1A is eliminated is called an MTC-dedicated DCI format 0.

When the MTC-dedicated DCI format 1A is used for MTC devices, the DCI format 0 can also be replaced with the MTC-dedicated DCI format 0.

Meanwhile, in case of using the MTC-dedicated DCI format 1, which has a length identical to that of the MTC-dedicated DCI format 1A, a flag (flag for format 1/format 1A differentiation) configured to distinguish the DCI format 1 from the DCI format 1A can be added to the DCI format 1 and the DCI format 1A, respectively.

Embodiment 7

As mentioned earlier with reference to the embodiment 1, if zero-padding is performed on a DCI format 1A, overhead of the DCI format 1A occurs. Embodiment 7 is proposed to solve a problem of the overhead. A method of transmitting control information transmitted to an MTC device according to the embodiment 7 of the present invention proposes to transmit the control information using an MTC-dedicated DCI format 1A (DCI format 1A for MTC). The MTC-dedicated DCI format 1A does not need to perform zero-padding in consideration of a length of the DCI format 0.

Basically, the MTC-dedicated DCI format 1A may follow a form of the legacy DCI format 1A. Yet, in this case, since the length of the MTC-dedicated DCI format 1A and the length of the DCI format 0 are not equal to the length of the DCI format 0, a flag (flag for format 0/format 1A differentiation) configured to distinguish the DCI format 0 from the DCI format 1A can be eliminated. Similar to embodiment 6, a DCI format 0 from which the flag (flag for format 0/format 1A differentiation) configured to distinguish the DCI format 0 from the DCI format 1A is eliminated is called an MTC-dedicated DCI format 0.

Meanwhile, according to embodiment 7 of the present invention, in order to solve a problem that an MTC device is unable to identify two formats since a length of the MTC-dedicated DCI format 1A is equal to a length of the DCI format 1, embodiment 7 proposes not to use the DCI format 1 to transmit control information used for the MTC device. In particular, an eNB may transmit PDCCH to the MTC device using a different DCI format except the DCI format 1.

Figure 9:
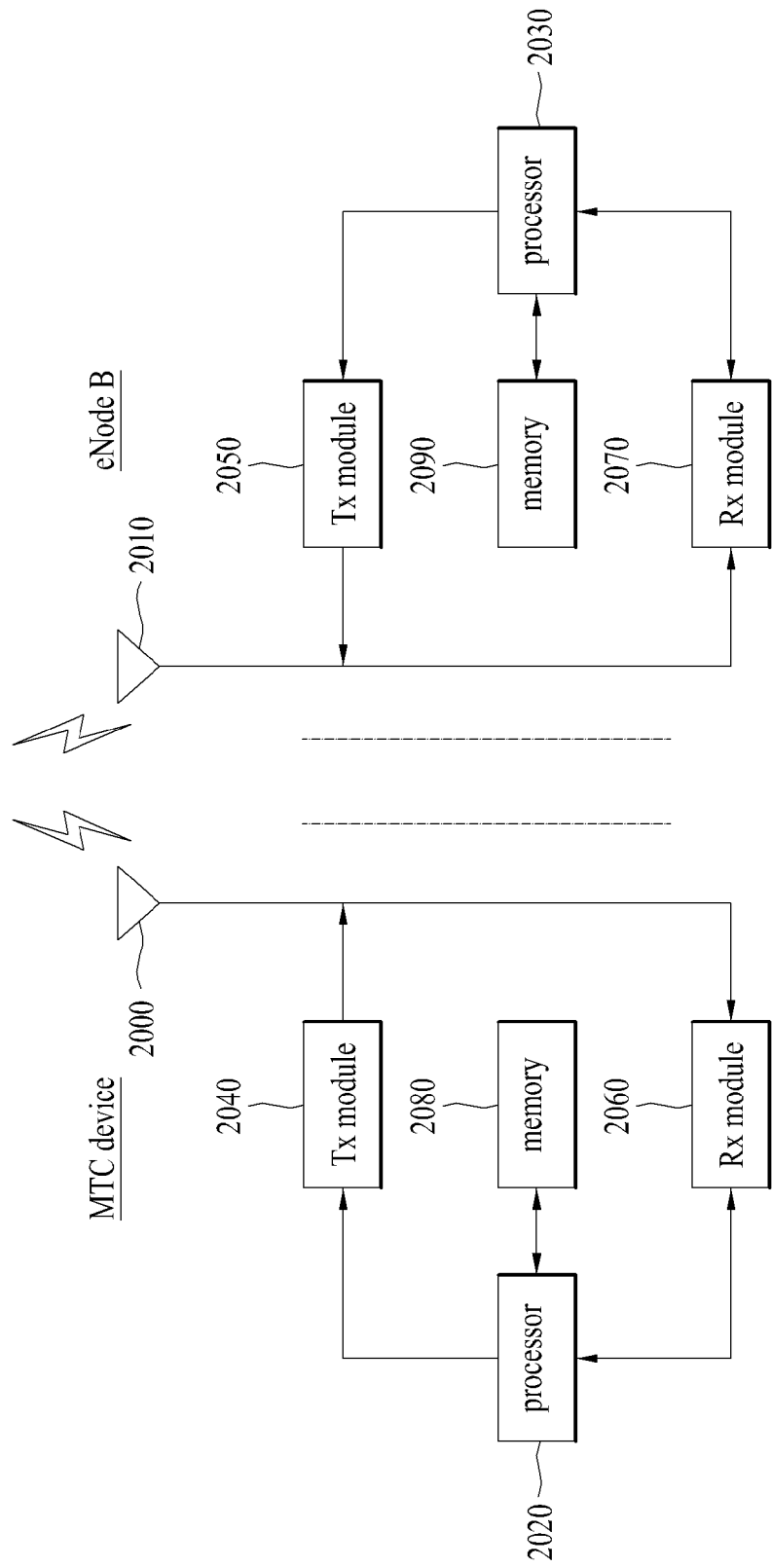
FIG. 9 is a diagram for devices capable of implementing methods explained with reference to FIG. 1 to FIG. 8.

FIG. 9 is a diagram for devices capable of implementing methods explained with reference to FIG. 1 to FIG. 8.

A user equipment (UE) operates as a transmitter in UL and operates as a receiver in DL. And, an eNode B (eNB) operates as a receiver in UL and operates as a transmitter in DL. In this case, the UE corresponds to an MTC device.

In particular, the UE and the eNB can include a transmission module (Tx module) 2040/2050 and a reception module (Rx module) 2060/2070, respectively. The UE and the eNB can include an antenna 2000/2010 and the like to transmit/receive information, data and/or a message.

And, the MTC device and the eNB can respectively include a processor 2020/2030 configured to perform the aforementioned embodiments of the present invention and a memory 2080/2090 configured to temporarily or consistently store a process of the processor.

The embodiments of the present invention can be performed using component elements and functions of the aforementioned MTV device and the eNB. The transmission module and the reception module included in the MTC device and the eNB can perform a packet modulation/demodulation function to transmit data, a fast packet channel coding function, an orthogonal frequency division multiple access (OFDMA) packet scheduling function, a time division duplex (TDD) packet scheduling function and/or a channel multiplexing function. The MTC device and the eNB shown in FIG. 9 can further include a low-power RF (radio frequency)/IF (intermediate frequency) module.

According to the embodiments of the present invention, the processor of the eNB can assign a DL bandwidth smaller than a system bandwidth used by a whole system to the MTC device. Due to the assigned small DL bandwidth, a length of a DCI format 1A becomes short. In doing so, a difference between the length of the DCI format 1A and a length of a DCI format 0 increases and a problem (e.g., overhead) may occur. In order to reduce the problem, the processor of the eNB sets a limit on the maximum number of RBs capable of being allocated to the MTC device.

The processor of the eNB according to one embodiment of the present invention configures the maximum number of RBs capable of being allocated to the MTC device to be smaller than the total number of RBs within the system band supported by the eNB.

The processor of the eNB can control the transmission module (Tx module) 2050 to transmit an UL grant signal based on the maximum number of RBs capable of being allocated to the MTC device. In this case, the UL grant signal may correspond to a DCI format 0.

And, the processor of the eNB can assign a UL bandwidth for PUSCH of the MTC device within a range not exceeding the maximum number of RBs capable of being allocated to the MTC device. The processor of the eNB can control the transmission module 2050 to signal the assigned UL bandwidth to the MTC device. In this case, the processor of the eNB can control the transmission module 2050 to inform the MTC device of the assigned UL bandwidth via upper layer signaling.

The Rx module (reception module) 2060 of the MTC device according to the present invention can receive a (upper layer) signal including the maximum number of RBs capable of being allocated to the MTC device and semi-statically allocated/designated to the MTC device from the eNB under the control of the processor 2020 of the MTC device. The processor 2020 of the MTC device can store the received maximum number of RBs capable of being allocated to the MTC device in the memory 2080.

The processor 2020 of the MTC device according to the present invention can control the Rx module (reception module) 2060 to receive a UL grant signal transmitted by the eNB. The UL grant signal may include resource allocation information and the resource allocation information can indicate one or more RBs for the PUSCH within the maximum number of RBs capable of being allocated to the MTC device. Having received the UL grant signal, the processor 2020 of the MTC device controls the Tx module 2040 to transmit the UL signal via the PUSCH (physical uplink shared channel) using at least one RB determined based on the maximum number of RBs capable of being allocated to the MTC device and the resource allocation information.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit 2080/2090 and is then drivable by a processor 2020/2030. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Embodiments of the present invention can be applied to various wireless access systems. Examples of the various wireless access systems include 3GPP ($3^{rd}$ generation partnership project), 3GPP2 and/or IEEE 802.xx (institute of electrical and electronic engineers 802) system and the like. The embodiments of the present invention can be applied to not only the various wireless access systems but also all technical fields to which the various wireless access systems are applied.

What is claimed is:

1. A method of transmitting an uplink signal, which is transmitted by a low-cost machine-type communication (MTC) device, the method comprising:
receiving a grant signal containing resource allocation information; and
transmitting the uplink signal via a physical uplink shared channel (PUSCH) using at least one resource block (RB) determined based on a maximum number of RBs capable of being allocated to the MTC device and the resource allocation information,
wherein the resource allocation information indicates one or more RBs for the PUSCH within the maximum number of RBs capable of being allocated to the MTC device,
wherein the maximum number of RBs capable of being allocated to the MTC device is smaller than a total number of RBs in a system band supported by an eNode B (eNB), and
wherein the maximum number of RBs capable of being allocated to the MTC device has a value identical to one selected from a group consisting of:
a number of RBs contained in a downlink bandwidth assigned to the MTC device,
a number resulting from multiplying the number of RBs contained in the downlink bandwidth assigned to the MTC device by a prescribed ratio,
a number of RBs contained in an MTC cell-specific downlink bandwidth corresponding to a downlink bandwidth commonly assigned to at least one MTC device belonging to one cell, and
a number resulting from multiplying the number of RBs contained in the MTC cell-specific downlink bandwidth corresponding to the downlink bandwidth commonly assigned to at least one MTC device belonging to one cell by a prescribed ratio.

2. The method of claim 1, wherein the downlink bandwidth assigned to the MTC device is smaller than a bandwidth of the system band.

3. The method of claim 1, wherein the step of transmitting the uplink signal uses at least one RB determined based on start position information of an RB capable of being allocated to the PUSCH, the maximum number of RBs capable of being allocated to the MTC device and the resource allocation information.

4. The method of claim 3, further comprising:
receiving the start position information and the maximum number of RBs capable of being allocated to the MTC device from the eNB.

5. A low-cost machine-type communication (MTC) device for transmitting an uplink signal, the MTC device comprising:
a radio frequency (RF) unit configured to transmit and receive a signal; and
a processor configured to:
control the RF unit to receive a grant signal containing resource allocation information, and
control the RF unit to transmit the uplink signal via a physical uplink shared channel (PUSCH) using at least one resource block (RB) determined based on a maximum number of RBs capable of being allocated to the MTC device and the resource allocation information,
wherein the resource allocation information indicates one or more RBs for the PUSCH within the maximum number of RBs capable of being allocated to the MTC device,
wherein the maximum number of RBs capable of being allocated to the MTC device is smaller than a total number of RBs in a system band supported by an eNode B (eNB), and
wherein the maximum number of RBs capable of being allocated to the MTC device has a value identical to one selected from a group consisting of:
a number of RBs contained in the downlink bandwidth assigned to the MTC device, a number resulting from multiplying the number of RBs contained in the downlink bandwidth assigned to the MTC device by a prescribed ratio, a number of RBs contained in an MTC cell-specific downlink bandwidth corresponding to a downlink bandwidth commonly assigned to at least one MTC device belonging to one cell, and a number resulting from multiplying the number of RBs contained in the MTC cell-specific downlink bandwidth corresponding to the downlink bandwidth commonly assigned to at least one MTC device belonging to one cell by a prescribed ratio.

6. The MTC device of claim 5, wherein the downlink bandwidth assigned to the MTC device is smaller than a bandwidth of the system band.

7. The MTC device of claim 5, wherein the processor is further configured to use at least one RB determined based on start position information of an RB capable of being allocated to the PUSCH, the maximum number of RBs capable of being allocated to the MTC device and the resource allocation information to transmit the uplink signal.

8. The MTC device of claim 7, wherein the processor is further configured to control the RF unit to receive the start position information and the maximum number of RBs capable of being allocated to the MTC device from the eNB.

9. A method of receiving an uplink signal, which is received by an eNode B (eNB) from a low-cost machine-type communication (MTC) device, the method comprising:

transmitting a grant signal based on a maximum number of resource blocks (RBs) capable of being allocated to the MTC device; and receiving the uplink signal via a physical uplink shared channel (PUSCH) corresponding to the grant signal from the MTC device, wherein the grant signal contains resource allocation information indicating one or more RBs for the PUSCH within the maximum number of RBs capable of being allocated to the MTC device, wherein the uplink signal is received via the PUSCH using at least one RB determined based on the maximum number of RBs capable of being allocated to the MTC device and the resource allocation information, wherein the maximum number of RBs capable of being allocated to the MTC device is smaller than a total number of RBs in a system band supported by the eNB, and wherein the maximum number of RBs capable of being allocated to the MTC device has a value identical to one selected from a group consisting of:

a number of RBs contained in the downlink bandwidth assigned to the MTC device, a number resulting from multiplying the number of RBs contained in the downlink bandwidth assigned to the MTC device by a prescribed ratio, a number of RBs contained in an MTC cell-specific downlink bandwidth corresponding to a downlink bandwidth commonly assigned to at least one MTC device belonging to one cell, and a number resulting from multiplying the number of RBs contained in the MTC cell-specific downlink bandwidth corresponding to the downlink bandwidth commonly assigned to at least one MTC device belonging to one cell by a prescribed ratio.

10. An eNode B (eNB) for receiving an uplink signal from a low-cost machine-type communication (MTC) device, the eNB comprising:

a radio frequency (RF) unit configured to transmit and receive a signal; and a processor configured to:

control the RF unit to transmit a grant signal based on a maximum number of resource blocks (RBs) capable of being allocated to the MTC device, control the RF unit to receive the uplink signal via a physical uplink shared channel (PUSCH) corresponding to the grant signal from the MTC device, wherein the grant signal contains resource allocation information indicating one or more RBs for the PUSCH within the maximum number of RBs capable of being allocated to the MTC device, wherein the uplink signal is received via the PUSCH using at least one RB determined based on the maximum number of RBs capable of being allocated to the MTC device and the resource allocation information, wherein the maximum number of RBs capable of being allocated to the MTC device is smaller than a total number of RBs in a system band supported by the eNB, and wherein the maximum number of RBs capable of being allocated to the MTC device has a value identical to one selected from a group consisting of:

a number of RBs contained in the downlink bandwidth assigned to the MTC device, a number resulting from multiplying the number of RBs contained in the downlink bandwidth assigned to the MTC device by a prescribed ratio, a number of RBs contained in an MTC cell-specific downlink bandwidth corresponding to a downlink bandwidth commonly assigned to at least one MTC device belonging to one cell, and a number resulting from multiplying the number of RBs contained in the MTC cell-specific downlink bandwidth corresponding to the downlink bandwidth commonly assigned to at least one MTC device belonging to one cell by a prescribed ratio.

\* \* \* \* \*